(12) United States Patent
Wierenga

(10) Patent No.: US 8,185,983 B2
(45) Date of Patent: *May 29, 2012

(54) AIRCRAFT SINK WITH INTEGRATED WASTE DISPOSAL FUNCTION

(75) Inventor: Scott M. Wierenga, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/212,275

(22) Filed: Aug. 18, 2011

(65) Prior Publication Data

US 2011/0308010 A1  Dec. 22, 2011

Related U.S. Application Data

(63) Continuation of application No. 10/907,625, filed on Apr. 8, 2005, now Pat. No. 8,011,033.

(51) Int. Cl.
*E03C 1/01* (2006.01)
*E03D 9/00* (2006.01)
(52) U.S. Cl. .......................................................... 4/664
(58) Field of Classification Search .............. 4/321, 323, 4/431
See application file for complete search history.

(56) References Cited

U.S. PATENT DOCUMENTS

| 1,331,018 | A | * | 2/1920 | Luthy | 429/143 |
| 4,108,192 | A | | 8/1978 | Michael | |
| 4,131,367 | A | * | 12/1978 | French et al. | 356/405 |
| 4,184,506 | A | | 1/1980 | Varis et al. | |
| 4,791,949 | A | * | 12/1988 | Tank | 137/1 |
| 5,317,763 | A | * | 6/1994 | Frank et al. | 4/434 |
| 5,396,668 | A | * | 3/1995 | Haatanen | 4/431 |
| 6,006,373 | A | * | 12/1999 | Hoang | 4/431 |
| 6,012,678 | A | | 1/2000 | Hale et al. | |
| 6,223,361 | B1 | | 5/2001 | Rozenblatt | |
| 6,385,789 | B1 | * | 5/2002 | Pondelick et al. | 4/427 |
| 2001/0011391 | A1 | * | 8/2001 | Rozenblatt | 4/653 |

FOREIGN PATENT DOCUMENTS

DE  4131367  3/1993
DE  20301649  7/2004

OTHER PUBLICATIONS

Area Lands Another 7E7 Deal, Adam Lowenstein, Copyright 2004, 3 pgs.

* cited by examiner

*Primary Examiner* — Lori Baker
(74) *Attorney, Agent, or Firm* — Ostrager Chong Flaherty & Broitman P.C.

(57) ABSTRACT

A sink system includes a sink coupled to a storage area. The storage area is coupled to a bypass line and a common line, and a vacuum blower may apply pressure to the common line. First and second valves control the flow of fluids between the bypass line, storage area and common line, for operation of the system in a drain mode and a disposal mode.

20 Claims, 4 Drawing Sheets

AIRCRAFT SINK WITH INTEGRATED WASTE DISPOSAL FUNCTION

RELATED APPLICATIONS

This application is a continuation of application Ser. No. 10/907,625 filed Apr. 8, 2005, the disclosure of which is incorporated herein by reference.

TECHNICAL FIELD

The present invention relates generally to sink systems, and more particularly to a sink system in an aircraft environment.

BACKGROUND OF THE INVENTION

In commercial aviation, it is necessary to dispose of unwanted fluids and solids. Currently, most commercial aircraft are equipped with galley and lavatory sinks; however, these sinks are primarily intended for the disposal of fluid waste only as they are connected to small diameter drain lines and drain primarily by gravity. These drains generally range from about one half to one inch in diameter and terminate at an aircraft drain mast for exhaustion to the atmosphere. Unfortunately, such sink systems are limited in their ability to dispose of more viscous liquid or solid waste products. Current sinks are also prone to blockage due to drainage of liquids that solidify when combined in the drain system.

Currently, disposal of most non-liquid wastes is accomplished through conventional vacuum systems for toilets and waste disposal units. While generally effective for disposing of solid, liquid and slurry food wastes, implementing one of the conventional vacuum toilet or waste disposal unit designs requires incorporation of a separate unit in addition to the sink. While these designs provide an alternate location for solid waste disposal, they do not eliminate the potential for clogged sink drain lines.

A problem with incorporating current galley sink designs into a vacuum waste system relates to noise. A loud flushing sound is created when the flush valve opens and the differential pressure across it forcefully draws the waste down the drain. To reduce the noise during drainage, a by-pass line can be installed to control the amount of airflow passing through the sink bowl. The bypass line reduces the noise but also reduces the amount of vacuum available help drain the sink.

The disadvantages associated with current aircraft sink systems have made it apparent that a new technique for removing waste from an airplane sink is needed. The new technique should minimize noise onboard the aircraft and allow system clogs to be flushed out.

SUMMARY OF THE INVENTION

In accordance with one embodiment of the present invention, a sink system includes a sink and a storage area receiving and storing matter from the sink. The storage area receives air from the bypass line during a flush. Matter from the storage area and sink is vacuumed through a common line during the flush. A first valve limits an amount of air supplied by the bypass line such that increased suction is applied to the sink through the common line, and a first actuator operates the first valve.

In accordance with another embodiment. A method for operating a sink system coupled to a common waste disposal line with a second waste disposal system is included. The sink system has a storage area receiving matter from a sink, receiving air from a bypass line as regulated by a first valve, and expelling waste through the common line as regulated by a second valve. The method includes setting initial conditions of the first valve open and the second valve closed. The method further includes activating a vacuum blower generating a pressure differential across the second valve, thereby opening the second valve and emptying the matter from the storage area, whereby the second valve closes at an end of emptying the matter. An amount of air supplied by the bypass line is limited in the case of a clog in the system by closing the first valve, such that increased suction is applied to the sink through the common line activating the vacuum blower.

Current airplane galleys include sinks and galley waste disposal units as separate units. Combining the galley waste disposal function with the galley sink function through use of the previously discussed common line would save weight, cost and space in galley modules.

Additional advantages and features of the present invention will become apparent from the description that follows and may be realized by the instrumentalities and combinations particularly pointed out in the appended claims, taken in conjunction with the accompanying drawings.

BRIEF DESCRIPTION OF THE DRAWINGS

For a complete understanding of the invention, there will now be described some embodiments thereof, given by way of example, reference being made to the accompanying drawings, in which.

DETAILED DESCRIPTION

Figures 1, 4:
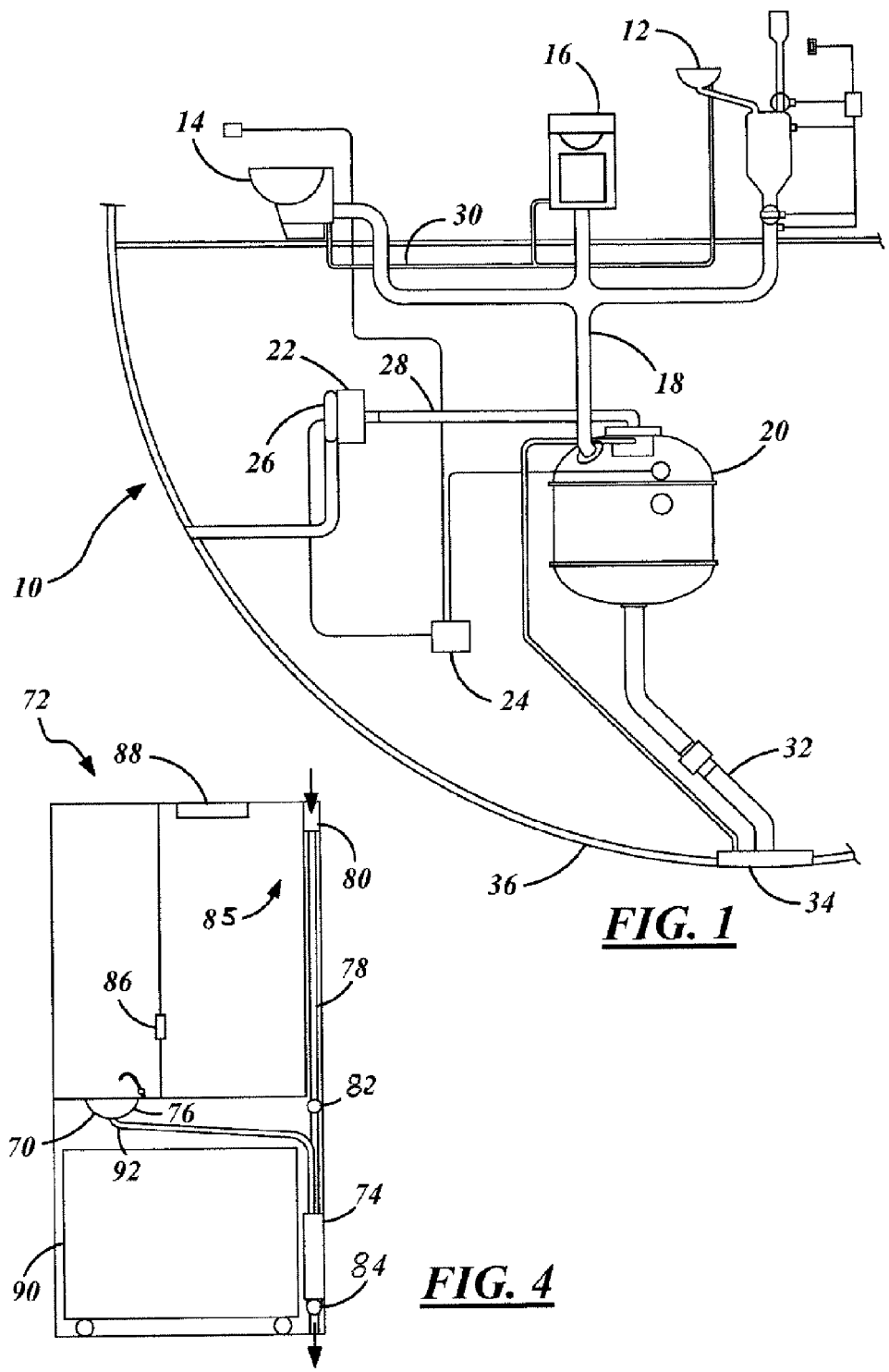
FIG. 1 is a schematic diagram of an airplane system including a sink system in accordance with one embodiment of the present invention.
FIG. 4 is schematic diagram of a sink system in accordance with another embodiment of the present invention.

The present invention is illustrated with respect to a sink system, particularly suited to the aerospace field. The present invention is, however, applicable to various other uses that may require sink systems, such as campers, railroad cars, buses, maritime vehicles, and other such vehicles, as will be understood by one skilled in the art. In each of the following figures, the same reference numerals are used to refer to the same components.

Referring to FIG. 1, an airplane system 10 including a sink system 12 is illustrated in accordance with one embodiment of the present invention. The system 10 further includes a toilet system 14 and a galley waste disposal system 16 disposing of matter (along with the sink system 12) through a common line 18. The common line 18 feeds into a tank assembly waste holding tank 20 and allows fluid and solid flow as a function of operation of a vacuum waste system 22.

The vacuum waste system 22 includes a controller 24 controlling a vacuum 26 which creates a pressure differential through vacuum lines 28. This vacuum waste system may include use of ambient pressure of the air outside of the aircraft or artificial source, such as a vacuum pump. Further, the sink system 12, the toilet system 14, and the galley waste disposal 16 receive water through rinse lines 30. Waste is expelled from the waste holding tank 20 via drain lines 32 through a service panel 34 on the exterior 36 of the aircraft system 10.

Figures 2, 3:
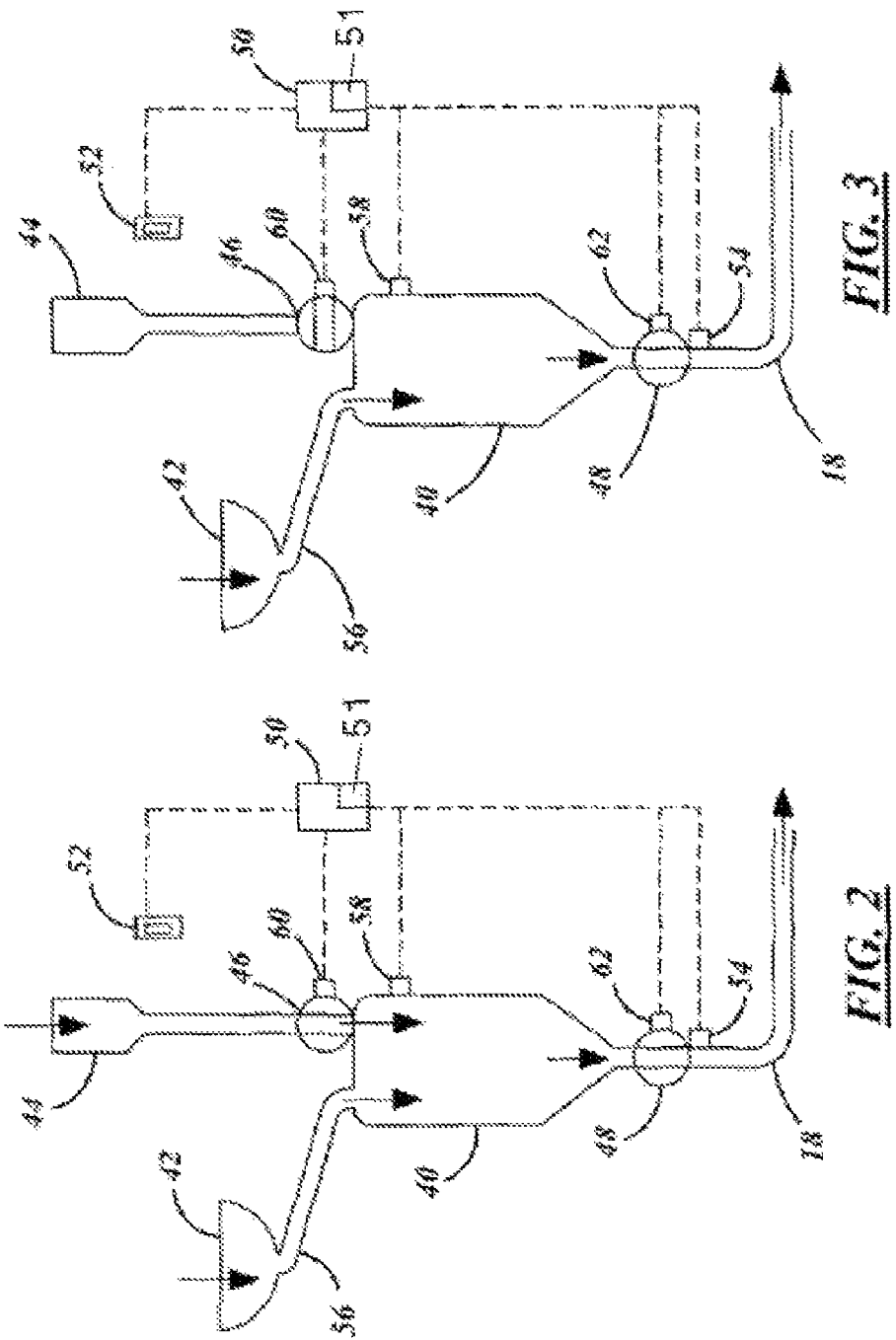
FIG. 2 is a schematic diagram of a sink system in accordance with another embodiment of the present invention.
FIG. 3 is a schematic diagram of the sink system of FIG. 2 in operation.
Figure 5:
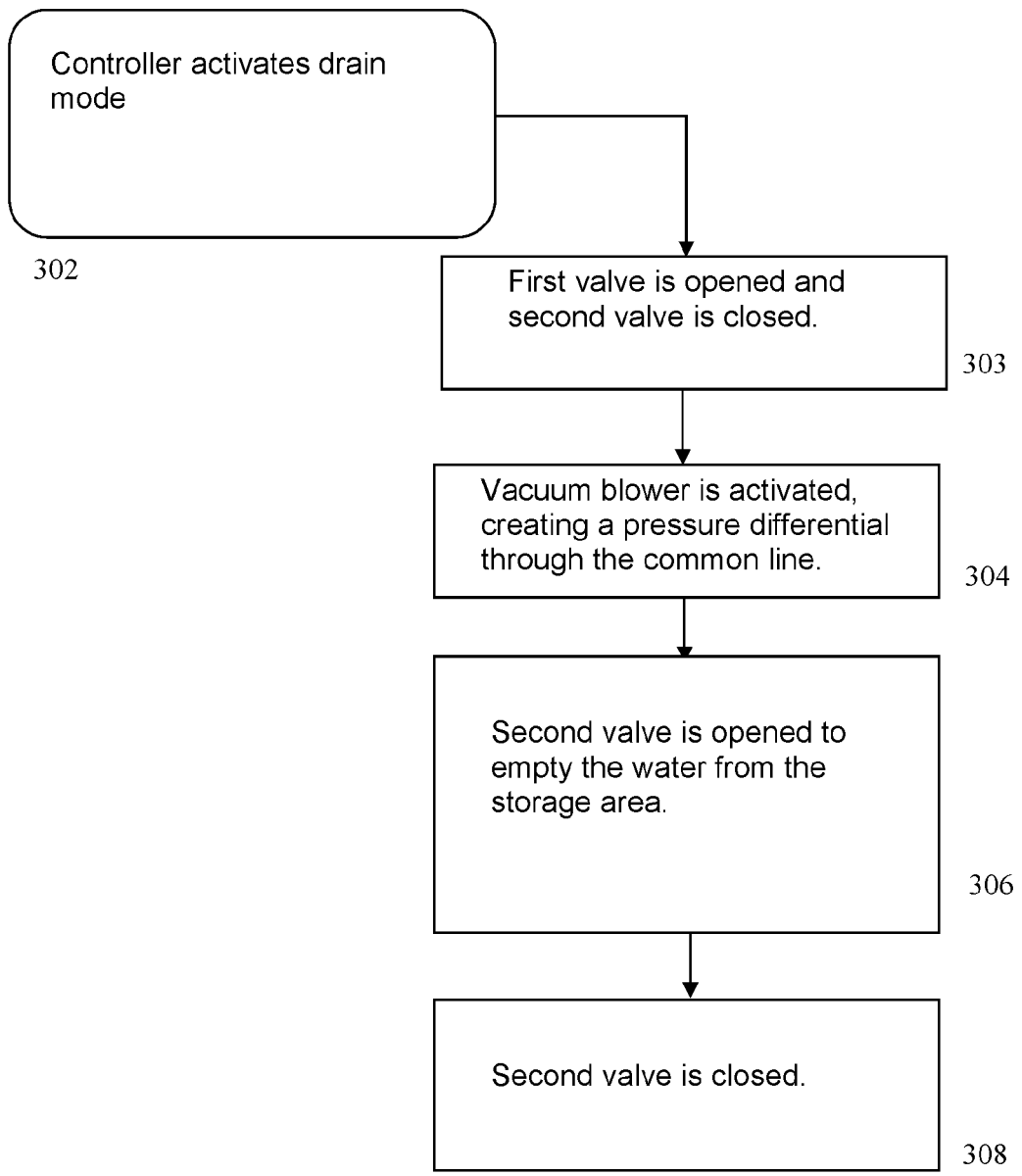
FIG. 5 is a flowchart depicting the algorithms for operating the system in a drain mode.

Referring to FIGS. 2 and 3, schematic diagrams of the sink system 12 are illustrated. The sink system 12 includes a storage area 40 receiving fluid from a sink 42 and air from a bypass line 44. The flow into and out of the storage area 40 is controlled by a disposal valve 46 (first valve) and a drain valve 48 (second valve), which are controlled by, for example, a controller 50 receiving signals from a disposal switch 52. Matter drains from the storage area 40 through the common line 18.

The sink 42 drains by gravity into the storage area 40 which may be a tank or an appropriately sized line. Waste water is retained in the storage area 40 by a normally closed second drain valve 48. The drain valve 48 is controlled automatically by the amount of water in the storage area 40 as detected by the level sensor 58 and by the pressure switch 54. The pressure switch 54 detects a clog as a function of the pressure differential across the second valve 48. The pressure switch 54 is required for use in a galley sink to prevent backflow.

The bypass line 44 provides a secondary path for air to enter the storage area 40 during a flush to limit noise inside the airplane galley area. The disposal valve 46 shuts off or limits the bypass line 44 causing more air flow and suction to be applied to the sink drain 56 to clear galley wastes or sink blockages. The disposal valve 46 and drain valve 48 manually activate through operation of the disposal mode switch 52.

The controller 50 includes algorithms 51 (control logic) for controlling vacuum blower operation and automatic and manual controls of valves. Coupled to the controller 50 is the disposal mode switch 52, which provides an airplane attendant with a manual means for activating the drain valve 48 in case of failure of the controller 50 or the automatic drain system or sink system 12. The controller may also activate a drain mode automatically as a function of signals received from the pressure switch 54.

The storage area 40 is a typical waste holding tank receiving matter from the sink 42 through the drain 56 and dispelling matter through the vacuum waste system. The storage area 40 is in direct communication, without obstruction, with the drain line 56, as shown in FIGS. 2 and 3. The level of the contents of the storage area 40 may be determined by a level switch 58 operably coupled to the controller 50. The controller may use this level information for control of the sink system 12. The storage area 40 includes two inlets, one from the drain 56 and one from the bypass line 44, and further includes an outlet through the common line 18. The inlet from the bypass line 44 is controlled by the first valve 46, and the dispelling of the matter through the common line 18 is conducted through the second valve 48. The first valve 46 may be controlled by an actuator 60 (first actuator) receiving signals from the controller 50. The second valve 48 may also be controlled by an actuator 62 (second actuator) receiving signals from the controller 50.

In another embodiment, the first valve 46 may be controlled manually by a handle accessible to the user. A position sensor on the first valve sends a signal to the controller 50 to initiate the disposal mode.

Referring to FIGS. 2, 3, 5 and 6, the operation of a drain mode and disposal mode of the sink system 12 is illustrated in accordance with another embodiment of the present invention. To begin with, sink water drains by gravity into the storage area 40 and is held until the level switch 58 activates the drain mode through, for example, the controller 50 (step 302). The drain mode includes the first valve 46 open and the second valve 48 closed (step 303). The drain mode activates the vacuum blower, which is connected to the common line 18, (in step 304) creating a pressure differential through the common line 18, which is verified by the pressure switch 54.

In step 306, the second valve 48 is then opened to empty the water stored in the storage area 40. In step 308, the second valve 48 closes at the end of this sequence. During drainage of the sink 42, air enters the storage area 40 through the bypass line 44 and the sink 42 as illustrated in FIG. 2, and the air inlet is located above sink 42. Further, during this operation, no action is required by a cabin attendant or airline attendant.

Figure 6:
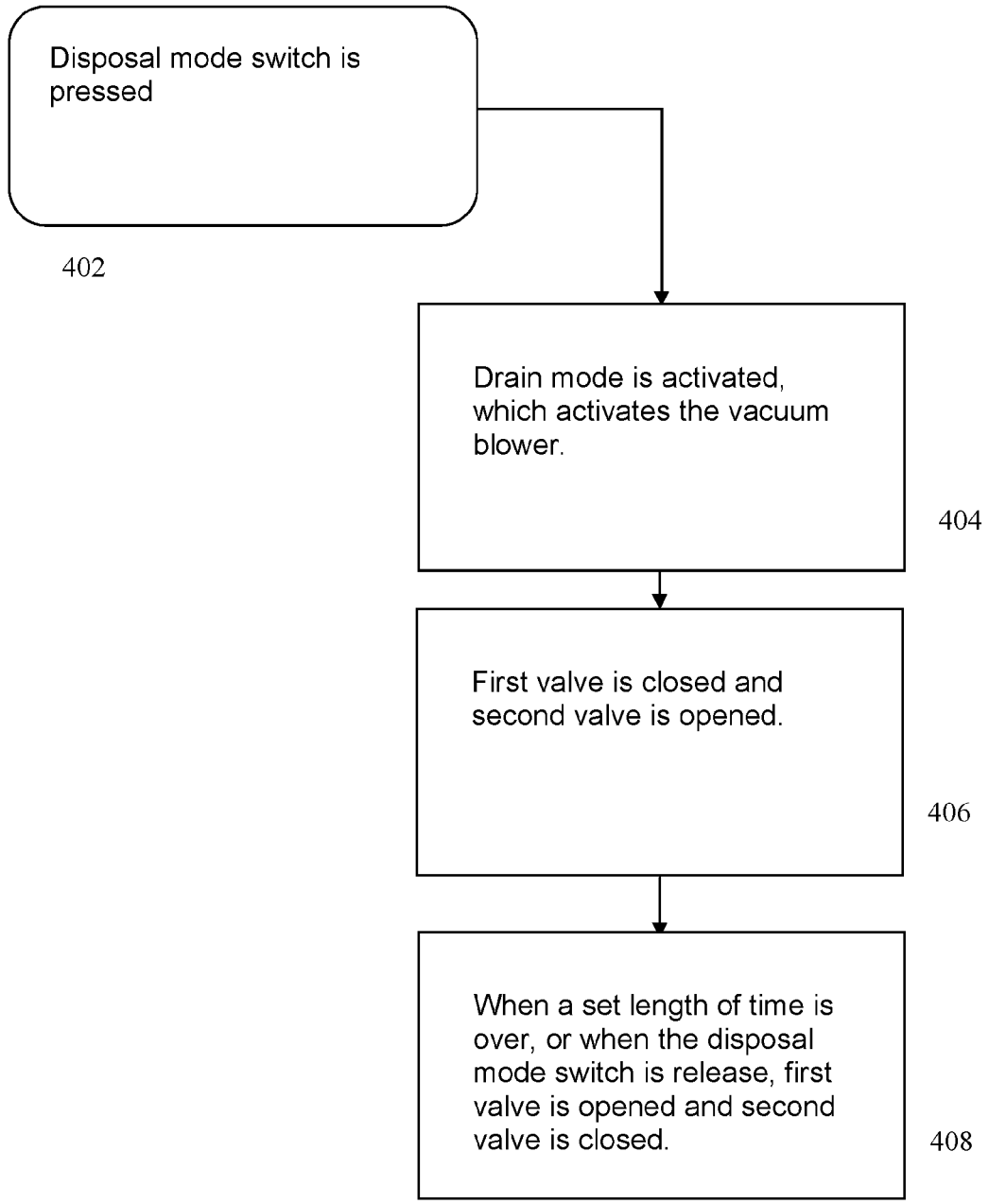
FIG. 6 is a flowchart depicting the algorithms for operating the system in a disposal mode.

Referring to FIGS. 3 and 6, the sink system 12 in disposal mode is illustrated in accordance with another embodiment of the present invention. In disposal mode, in step 402, the cabin attendant presses the disposal mode switch 52, thereby activating the drain mode in the controller 50, which activates the vacuum blower (step 404). The pressure switch 54 verifies that the vacuum blower is pulling materials through the common line 18, thereby completing the drain mode. The controller 50 then opens the second valve 48 and closes the first valve 46 (step 406), and at the end of the disposal mode, the first valve 46 opens and the second valve 48 closes (step 408).

During drainage in the disposal mode, air enters only through the sink 42 such that full vacuum system pressure will be applied to any blockages in all drain lines 56. The length of the disposal mode may be timed through a set length in the controller 50 or controlled by a press and hold switch such as the disposal mode switch 52.

Referring to FIG. 4, an alternate embodiment of a sink system 70 within a galley unit system 72 is illustrated in accordance with another embodiment of the present invention. The galley unit system 72 includes the storage area 74 receiving materials from the sink 76 and receiving air from the bypass line through the air inlet 80. As in the previous embodiments, the air inlet is located above sink 76 and the system 70 is controlled by two valves 82, 84 controlling the air inlet and the drainage of the storage area 74.

In accordance with this embodiment of the present invention, the storage area 74 may be sized to fit behind the galley carts 90 in the galley unit 72. Further, the drain valve or second valve 84 may be installed at the base of the storage area 74 and the outlet may be pumped to the vacuum waste system, as was discussed previously. Plumbing from the sink 76 may gravity drain into the storage area 74. The air inlet 80 to the bypass line 78 may be routed higher than the sink 76 and may also be routed to an overhead area 85 for minimizing noise in the cabin. The disposal valve or first valve 82 may be either installed at the storage area 74 or remotely. The disposal mode switch 86 may be installed in the galley unit 72 near the sink 76.

Further, other galley drains, for example the sump pump drains, may be either connected to the system 70 either directly to the storage area 74 or upstream of the first valve 82 to maintain the effectiveness of the aforementioned disposal mode. Odors from the storage area 74 may be vented through the lavatory galley vent system 88, which may be connected to the bypass line 78.

Through the aforementioned embodiment, a cart 90 is pushed underneath the sink for optimizing storage space. Further, an advantage is that every sink has disposal capabilities.

In operation, the sink system disposal mode will clear blockages in galley plumbing. Operation of the disposal mode of the sink system 70 provides manual backup to the sink drain 92 if failure of the automatic sink system 70 occurs.

In other words, the method includes setting initial conditions of the first valve open and the second valve closed. The method further includes activating a vacuum blower generating a pressure differential across the second valve, thereby opening the second valve and emptying the matter from the storage area, whereby the second valve closes at an end of emptying the matter. An amount of air supplied by the bypass line is limited in the case of a clog in the system by closing the first valve, such that increased suction is applied to the sink through the common line activating the vacuum blower.

From the foregoing, it can be seen that there has been brought to the art a new sink system. It is to be understood that the preceding description of one embodiment of the present invention is merely illustrative of some of the many specific embodiments that represent applications of the principals of the present invention. Numerous and other arrangements would be evident to those skilled in the art without departing from the scope of the invention as defined by the following claims.

I claim:

1. A sink system comprising:
a storage area;
a sink, coupled via a sink drain line, to said storage area;
a bypass line, coupled via a disposal valve, to said storage area;
a common line, coupled via a drain valve, to said storage area;
a vacuum blower connected to, and capable of creating a pressure differential through said common line; and
a controller having control logic for operating the system in a drain mode and a disposal mode;
said disposal valve and said drain valve both being movable between an open position and a closed position, during the drain mode and the disposal mode, the disposal valve is initially in the open position and the drain valve is initially in the closed position;
during the drain mode, said drain valve and said disposal valve are in the open position while said vacuum blower is activated;
during the disposal mode, said drain valve is in the open position and said disposal valve is in the closed position while the vacuum blower is activated.

2. The sink system of claim 1, wherein:
when said drain valve is in said open position, fluid is permitted to flow between said storage area and said common line, and when said drain valve is in said closed position, fluid is substantially not permitted to flow between said storage area and said common line; and
when said disposal valve is in said open position, fluid is permitted to flow between said bypass line and said storage area, and when said disposal valve is in said closed position, fluid is substantially not permitted to flow between said bypass line and said storage area.

3. The sink system of claim 1, wherein:
said bypass line has an open end, permitting air to flow through said bypass line to said storage area.

4. The sink system of claim 1, wherein:
said controller is connected to said drain valve, said disposal valve and said vacuum blower.

5. The sink system of claim 1, further comprising:
a disposal mode switch connected to said controller;
wherein said controller activates said disposal mode when said disposal mode switch is pressed.

6. The sink system of claim 5, wherein:
said disposal mode switch is a press and hold switch; and
said controller completes said disposal mode when said disposal mode switch is released.

7. The sink system of claim 5, wherein:
said controller completes said disposal mode a fixed amount of time after said disposal mode switch is pressed.

8. The sink system of claim 1, further comprising:
a pressure switch which detects a clog as a function of the pressure differential across the drain valve;
wherein said controller opens the drain valve when the pressure switch detects a clog.

9. The sink system of claim 1, further comprising:
a handle coupled to said disposal valve; and
a position sensor coupled to said disposal valve;
wherein said controller activates said disposal mode when said position sensor sends a signal to said controller to activate said disposal mode.

10. The sink system of claim 1, wherein:
during the disposal mode, air enters the storage area only through the sink.

11. A method of operating a sink system, said sink system comprising a storage area, a sink coupled to said storage area, a bypass line coupled to said storage area through a disposal mode valve, a common line coupled to said storage area through a drain mode valve, and a vacuum blower coupled to said common line, the method comprising:
during a drain mode in which the disposal valve is initially open and the drain valve is initially closed, activating said vacuum blower, opening said drain valve, and closing said drain valve upon completion of said drain mode; and
during a disposal mode in which the disposal valve is initially open and the drain valve is initially closed, activating said vacuum blower, closing said disposal valve, opening said drain valve, and closing said drain valve upon completion of said disposal mode.

12. The method claim 11, wherein:
when said drain valve is in said open position, fluid is permitted to flow between said storage area and said common line, and when said drain valve is in said closed position, fluid is substantially not permitted to flow between said storage area and said common line; and
when said disposal valve is in said open position, fluid is permitted to flow between said bypass line and said storage area, and when said disposal valve is in said closed position, fluid is substantially not permitted to flow between said bypass line and said storage area.

13. The method of claim 11, wherein:
said bypass line has an open end, permitting air to flow through said bypass line to said storage area.

14. The method of claim 11, wherein:
said drain mode is activated before said disposal mode.

15. The method of claim 11, wherein:
said disposal mode is activated before said drain mode.

16. The method of claim 11, wherein:
said disposal mode is activated when a disposal mode switch is pressed and completed when said disposal mode switch is released.

17. The method of claim 11, wherein:
said disposal mode is activated when a disposal mode switch is pressed and completed a fixed amount of time after said disposal mode switch is pressed.

18. The method of claim 11, further comprising:
opening the drain valve when a pressure switch which senses the pressure differential across said drain valve detects a clog.

19. The method of claim 11, wherein:
said disposal mode is activated when a position sensor connected to said disposal valve sends a signal to said controller to activate said disposal mode.

20. The method of claim 11, wherein:
during the disposal mode, air enters the storage area only through the sink.

* * * * *